(12) United States Patent
Han (10) Patent No.: US 12,031,616 B2
(45) Date of Patent: Jul. 9, 2024

(54) POWER TRANSMISSION DEVICE AND AUTOMOBILE INCLUDING THE SAME

(71) Applicant: HYUNDAI MOBIS CO., LTD., Seoul (KR)

(72) Inventor: Kyung Won Han, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/408,702

(22) Filed: Aug. 23, 2021

(65) Prior Publication Data

US 2022/0349461 A1 Nov. 3, 2022

(30) Foreign Application Priority Data

Apr. 29, 2021 (KR) .................. 10-2021-0055514

(51) Int. Cl.

| | | |
|---|---|---|
| *F16H 48/36* | (2012.01) | |
| *B60K 1/00* | (2006.01) | |
| *B60K 17/04* | (2006.01) | |
| *B60K 17/08* | (2006.01) | |
| *B60K 17/16* | (2006.01) | |
| *B60K 17/36* | (2006.01) | |
| *B60K 23/04* | (2006.01) | |

(52) U.S. Cl.
CPC ............. *F16H 48/36* (2013.01); *B60K 23/04* (2013.01); *B60K 2023/043* (2013.01); *F16H 2048/368* (2013.01)

(58) Field of Classification Search
CPC ...... F16H 3/58; F16H 48/35; F16H 2048/368; F16H 3/62; F16H 3/64; F16H 3/66; F16H 3/663; F16H 3/666; B60K 23/04; B60K 2023/043

See application file for complete search history.

(56) References Cited

U.S. PATENT DOCUMENTS

| | | | | |
|---|---|---|---|---|
| 4,479,404 A | * | 10/1984 | Stockton | ................... F16H 3/66 |
| | | | | 475/318 |
| 7,559,864 B2 | * | 7/2009 | Maeda | ................... B60K 6/445 |
| | | | | 180/65.31 |
| 9,950,607 B2 | * | 4/2018 | Littlefield | .............. B60K 6/365 |
| 2012/0202640 A1 | | 8/2012 | Morimoto | |
| 2015/0330492 A1 | | 11/2015 | Lee et al. | |

(Continued)

FOREIGN PATENT DOCUMENTS

| | | |
|---|---|---|
| CN | 108953539 A | 12/2018 |
| CN | 112238746 A | 1/2021 |
| WO | WO 2011/122063 A1 | 10/2011 |

(Continued)

OTHER PUBLICATIONS

Extended European search report issued on Feb. 14, 2022, in counterpart European Patent Application No. 21195071.2 (7 pages in English).

(Continued)

*Primary Examiner* — Tinh Dang
(74) *Attorney, Agent, or Firm* — NSIP Law (57) ABSTRACT

A power transmission device includes: a motor to drive a rotary shaft; a first reducer to receive torque from the rotary shaft; a second reducer to receive torque from the first reducer; and a first clutch disposed outside the second reducer to connect and disconnect the second reducer and an external component.

19 Claims, 4 Drawing Sheets

(56) References Cited

U.S. PATENT DOCUMENTS

2019/0383373 A1* 12/2019 Engerman ................. F16H 3/54
2020/0122563 A1*  4/2020 Scholle .................... B60K 6/48

FOREIGN PATENT DOCUMENTS

WO    WO 2016/178382 A1    11/2016
WO    WO-2019192806 A1 *  10/2019  ............. F16H 48/36

OTHER PUBLICATIONS

Korean Office Action issued on Nov. 10, 2022, in counterpart Korean Patent Application No. 10-2021-0055514 (9 pages in Korean).

* cited by examiner

POWER TRANSMISSION DEVICE AND AUTOMOBILE INCLUDING THE SAME

CROSS-REFERENCE TO RELATED APPLICATION(S)

This application claims priority from and the benefit of Korean Patent Application No. 10-2021-0055514, filed on Apr. 29, 2021, which is hereby incorporated by reference for all purposes as if set forth herein.

TECHNICAL FIELD

Exemplary embodiments relate to a power transmission device and an automobile including the power transmission device and, more particularly, to a power transmission device enabling variable speed reduction and an automobile including the power transmission device.

BACKGROUND

In electric automobiles equipped with a reducer that reduces a rotation speed of a motor and transmits the reduced rotation speed to wheels, a planetary gear reducer having a structure, in which a sun gear, a planetary gear, a ring gear, and a carrier are coupled to each other, is generally provided.

A plurality of different reduction ratios of the planetary gear mounted to an automobile may be required so as to obtain the optimal efficiency according to traveling conditions of the automobile. However, the structure of the reducer becomes complicated so as to provide a plurality of reduction ratios. Thus, not only does the volume occupied by the reducer increase, but also the durability of the reducer is deteriorated due to the complicated structure. Thus, in order to manufacture the reducer that provides the plurality of reduction ratios, the configuration of the reducer needs to be simplified, and the durability of the reducer also needs to be improved.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a power transmission device includes: a motor configured to drive a rotary shaft; a first reducer configured to receive torque from the rotary shaft; a second reducer configured to receive torque from the first reducer; and a first clutch disposed outside the second reducer and configured to connect and disconnect the second reducer and an external component.

The first reducer may include: a first sun gear configured to receive power from the rotary shaft; and a first planetary gear disposed outside of the first sun gear and engaged with the first sun gear.

The second reducer may include: a second sun gear; and a second planetary gear disposed outside of the second sun gear, engaged with the second sun gear, and configured to rotate together with the first planetary gear.

The second reducer may include a ring gear disposed outside of the second planetary gear and engaged with the second planetary gear.

The first clutch may be disposed outside the ring gear and configured to connect and disconnect the ring gear and the external component.

The power transmission device may further include a second clutch disposed outside the second reducer and configured to connect and disconnect the second reducer and the external component, and the second clutch may be disposed outside the second sun gear and configured to connect and disconnect the second sun gear and the external component.

The power transmission may include a carrier coupled to the first reducer and the second reducer and configured to transmit the torque of the first reducer to the second reducer.

The power transmission device may further include a differential gear connected to the carrier.

The rotary shaft may be connected to a center of the first sun gear.

The rotary shaft may be spaced apart from a center of the first sun gear in a radial direction (R) of the first sun gear.

The power transmission device may further include: a first rotary gear connected to the carrier and configured to rotate together with the carrier; and a second rotary gear disposed between the first rotary gear and the differential gear and engaged with the first rotary gear.

The power transmission device may further include a third rotary gear connected to the rotary shaft and configured to rotate together with the rotary shaft, and the third rotary gear may be disposed outside of the first sun gear and engaged with the first sun gear.

In another general aspect, an automobile includes: a first wheel disposed on a left side of the automobile and a second wheel disposed on a right side of the automobile; and a power transmission device configured to provide torque to the first wheel and the second wheel. The power transmission device includes: a motor configured to drive a rotary shaft; a first reducer configured to receive torque from the rotary shaft; a second reducer configured to receive torque from the first reducer; a carrier coupled to the first reducer and the second reducer; and a first clutch disposed outside the second reducer and configured to connect and disconnect the second reducer and an external component.

The power transmission device may further include a differential gear connected to the carrier, the first reducer may include: a first sun gear configured to receive power from the rotary shaft; and a first planetary gear disposed outside of the first sun gear and engaged with the first sun gear, and the second reducer may include: a second sun gear; and a second planetary gear disposed outside of the second sun gear, engaged with the second sun gear, and configured to rotate together with the first planetary gear.

The differential gear may include: a first internal gear connected to a first wheel shaft connected to the first wheel and configured to rotate together with the first wheel; a second internal gear connected to a second wheel shaft connected to the second wheel and configured to rotate together with the second wheel; and an external gear disposed outside of the first internal gear and the second internal gear and engaged with the first internal gear and the second internal gear, and the external gear may be connected to the carrier and configured to rotate together with the carrier.

The first internal gear may include: an inner gear connected to the first wheel; and an outer gear disposed between the inner gear and the external gear and engaged with the inner gear and the external gear.

The rotary shaft may be spaced apart, in a radial direction (R) of the first sun gear, from a first wheel shaft connected to the first wheel and a second wheel shaft connected to the second wheel.

The first sun gear may be spaced apart from the first wheel shaft and the second wheel shaft in the radial direction (R) of the first sun gear.

A center of the first sun gear may be is spaced apart from the first wheel shaft and the second wheel shaft in the radial direction (R) of the first sun gear.

The first wheel shaft and the second wheel shaft may pass through a center of the first sun gear.

Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Hereinafter, a power transmission device and an automobile including the power transmission device according to the present disclosure will be described with reference to the drawings.

Power Transmission Device

Figure 1:
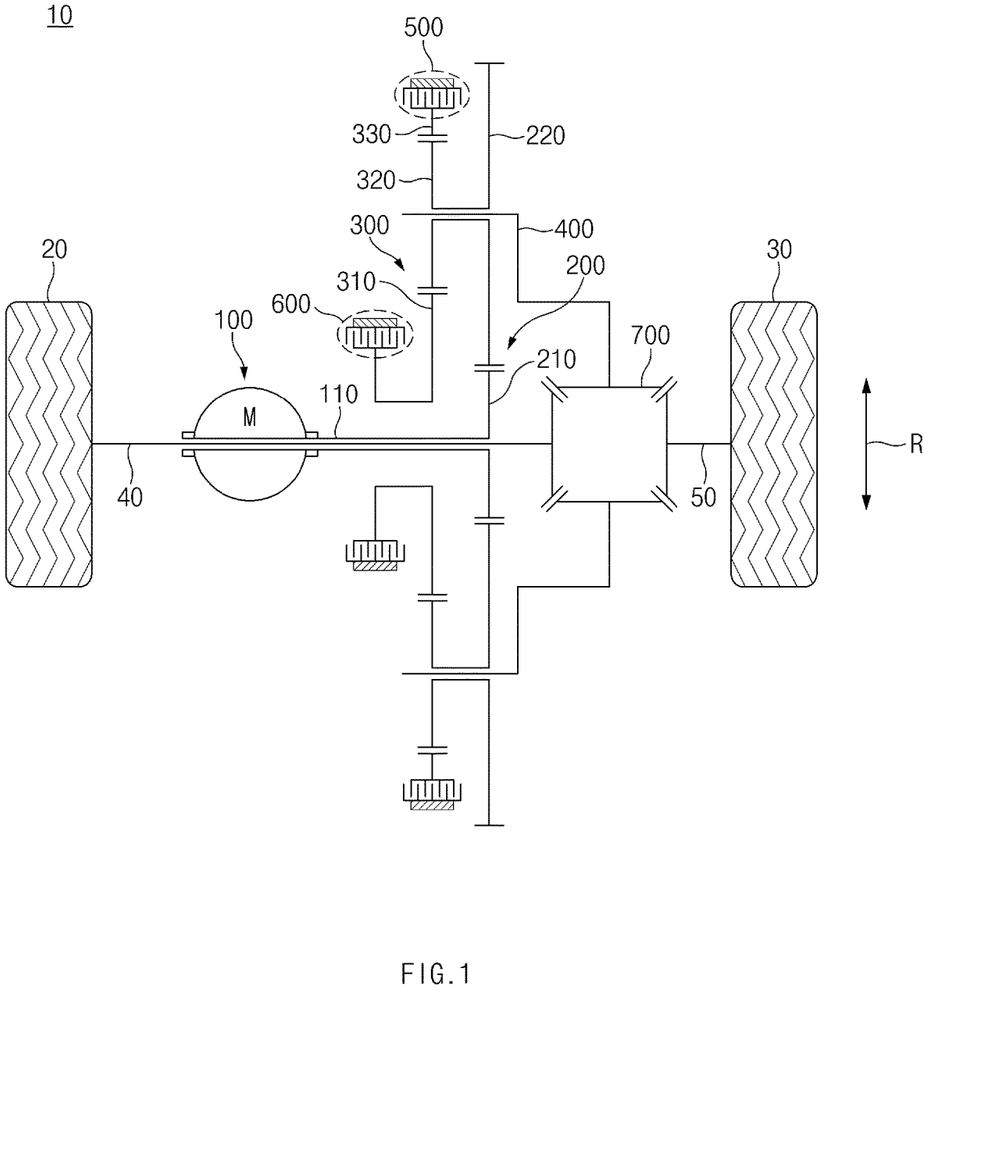
FIG. 1 is a view illustrating a structure of a power transmission device according to a first exemplary embodiment of the present disclosure.
Figure 2:
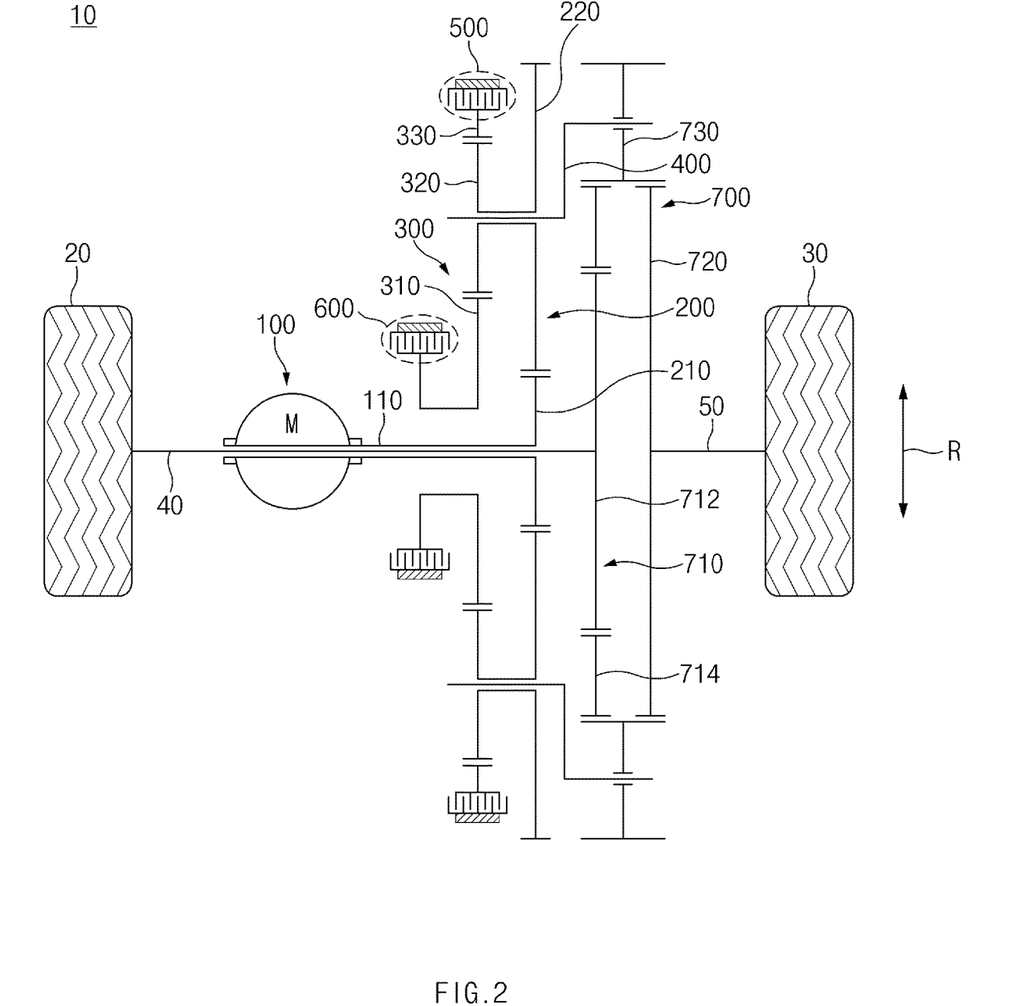
FIG. 2 is a view illustrating a structure of a power transmission device according to a second exemplary embodiment of the present disclosure.
Figure 3:
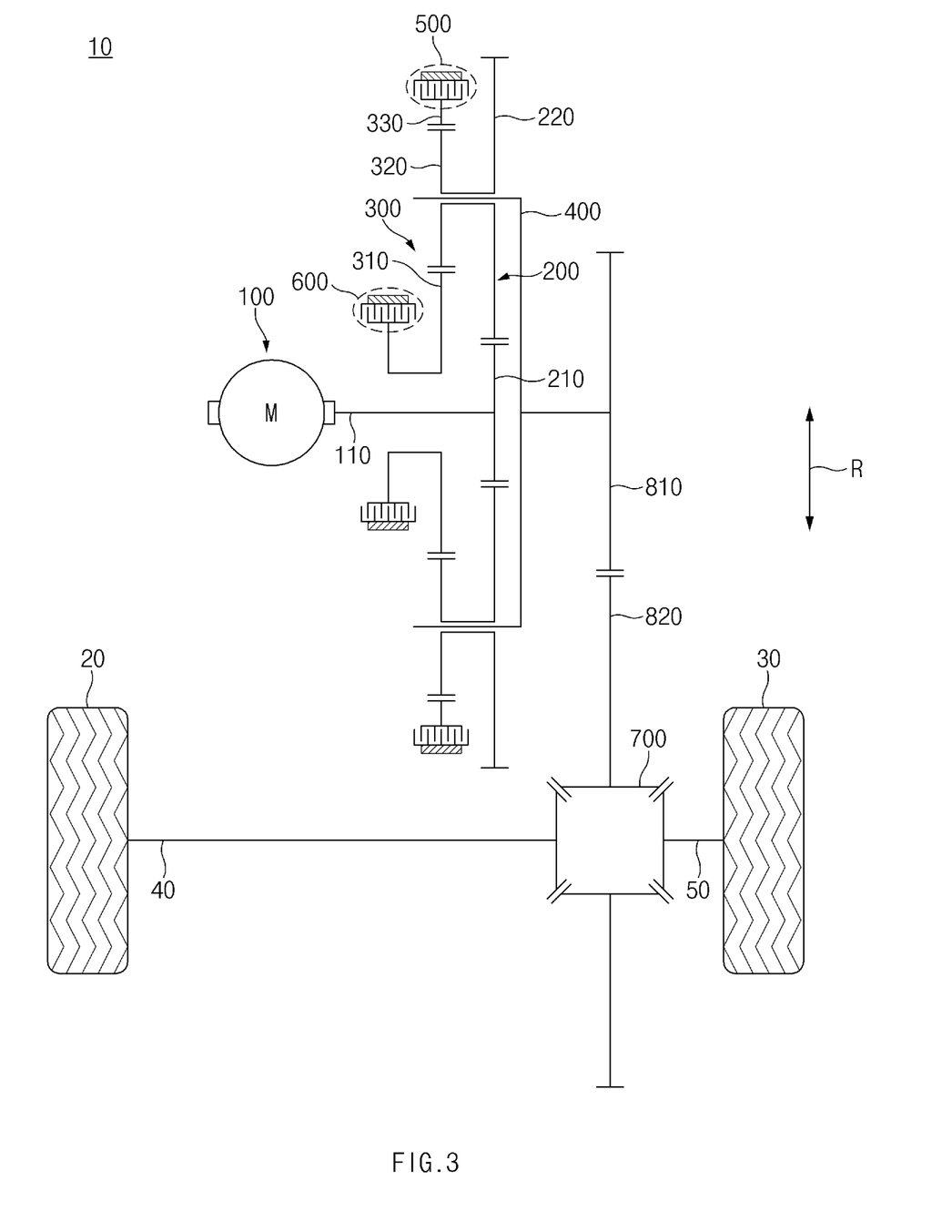
FIG. 3 is a view illustrating a structure of a power transmission device according to a third exemplary embodiment of the present disclosure.
Figure 4:
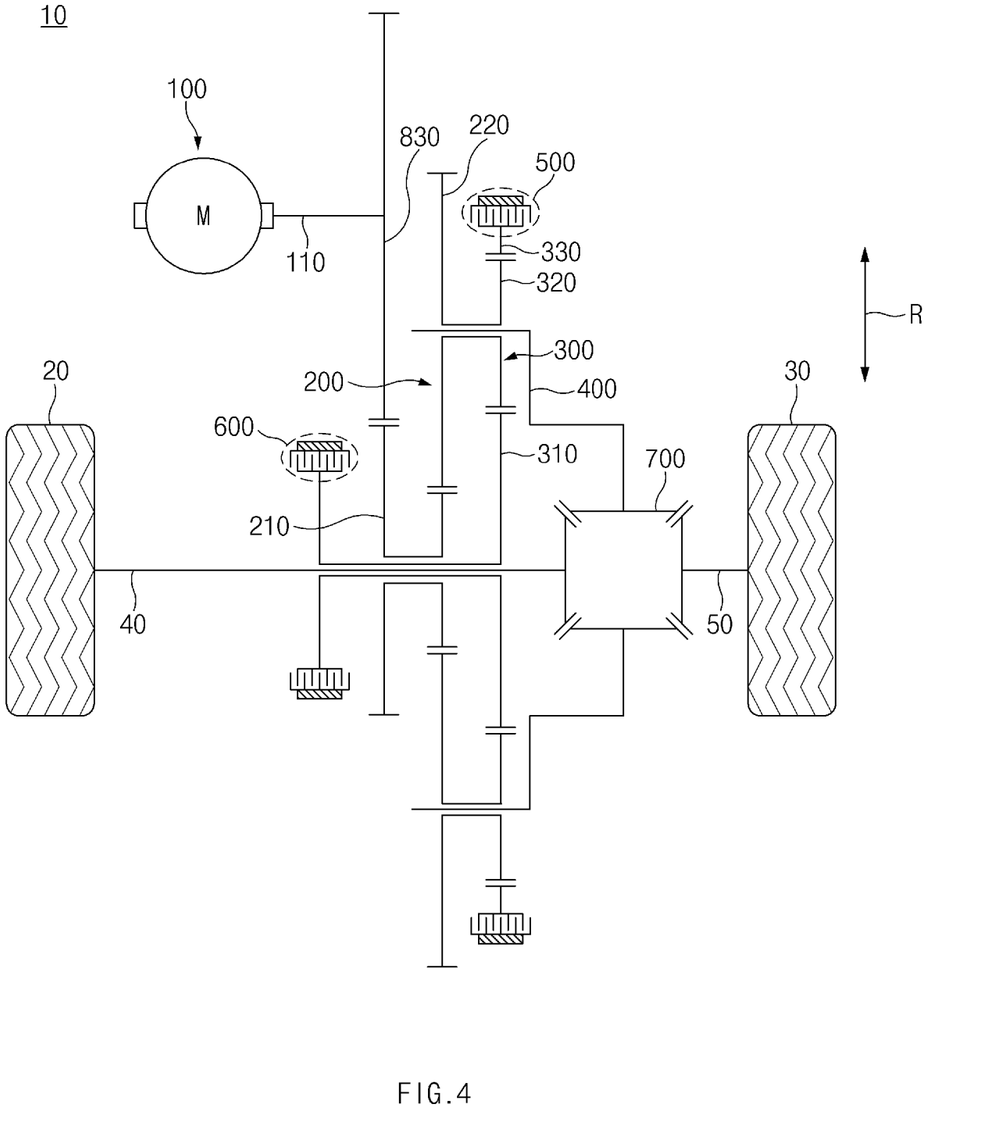
FIG. 4 is a view illustrating a structure of a power transmission device according to a fourth exemplary embodiment of the present disclosure.

FIG. 1 is a view illustrating a structure of a power transmission device according to a first exemplary embodiment of the present disclosure, and FIG. 2 is a view illustrating a structure of a power transmission device according to a second exemplary embodiment of the present disclosure. Also, FIG. 3 is a view illustrating a structure of a power transmission device according to a third exemplary embodiment of the present disclosure, and FIG. 4 is a view illustrating a structure of a power transmission device according to a fourth exemplary embodiment of the present disclosure.

As illustrated in FIGS. 1 to 4, a power transmission device 10 according to the present disclosure may include a motor 100 that generates power to drive a rotary shaft 110. As illustrated in FIGS. 1 to 4, the motor 100 may be provided outside wheels 20 and 30, but on the other hand, the motor 100 may be provided inside the wheels 20 and 30. Meanwhile, according to the present disclosure, the rotary shaft 110 driven by the motor 100 may have a straight line shape.

Also, the power transmission device 10 may include: a first reducer 200 receiving torque from the rotary shaft 110; a second reducer 300 receiving torque from the first reducer 200; and a carrier 400 coupled to the first reducer 200 and the second reducer 300.

More specifically, the first reducer 200 may include: a first sun gear 210 receiving power from the rotary shaft 110; and a first planetary gear 220 provided on the outside of the first sun gear 210 and engaged with the first sun gear 210. That is, the first planetary gear 220 may revolve outside the first sun gear 210. Thus, according to the present disclosure, the rotation speed may be reduced as the power is transmitted from the first sun gear 210 to the first planetary gear 220.

Also, the second reducer 300 may include: a second sun gear 310; a second planetary gear 320 which is provided on the outside of the second sun gear 310, engaged with the second sun gear 310, and rotates together with the first planetary gear 220; and a ring gear 330 provided on the outside of the second planetary gear 320 and engaged with the second planetary gear 320. More specifically, the second planetary gear 320 is directly connected to the first planetary gear 220, and thus, the first planetary gear 220 and the second planetary gear 320 may be fixed to each other. Also, the second planetary gear 320 may revolve on the outside of the second sun gear 310. The second planetary gear 320 may rotate inside the ring gear 330 and, at the same time, may revolve. Meanwhile, as illustrated in FIG. 1, according to the present disclosure, an outer diameter of the second sun gear 310 may be greater than an outer diameter of the first sun gear 210, and an outer diameter of the first planetary gear 220 may be greater than an outer diameter of the second planetary gear 320. However, the relationship between the sizes of outer diameters described above is not limited thereto.

As described above, according to the present disclosure, the first planetary gear 220 and the second planetary gear 320 may be fixed to each other. Thus, the rotation motion may be synchronized with each other between the first planetary gear 220 and the second planetary gear 320. That is, according to the present disclosure, when the first planetary gear 220 rotates, the second planetary gear 320 may rotate at the same rotational angular velocity as the first planetary gear 220. On the contrary, when the second planetary gear 320 rotates, the first planetary gear 220 may rotate at the same rotational angular velocity as the second planetary gear 320.

Continuing to refer to FIGS. 1 to 4, the power transmission device 10 according to the present disclosure may further include a first clutch 500 and a second clutch 600, which are provided outside the second reducer 300. The first clutch 500 and the second clutch 600 may be components for connecting or disconnecting the second reducer 300 and an external component of the power transmission device. For example, when the power transmission device 10 according to the present disclosure is mounted to an automobile, the first clutch 500 and the second clutch 600 may be components for selectively fixing or disconnecting some parts of the second reducer 300 and other components of the automobile.

More specifically, as illustrated in FIGS. 1 to 4, the first clutch 500 may be provided outside the ring gear 330 and may connect or disconnect the ring gear 330 and the external component of the power transmission device. Also, the second clutch 600 may be provided outside the second sun gear 310 and may connect or disconnect the second sun gear 310 and the external component of the power transmission device. The description of the structures and operation principles of the first clutch 500 and the second clutch 600 will be replaced with the description of a clutch according to the related art.

Continuing to refer to FIGS. 1 to 4, the power transmission device 10 according to the present disclosure may further include a differential gear 700 connected to the carrier 400. There is a difference in rotation speeds between a left wheel and a right wheel of an automobile, for example, when the automobile is steered, and the differential gear 700 may be component for providing the left wheel and the right wheel with torques having different rotation speeds. The configuration of the differential gear 700 will be described later.

Meanwhile, as illustrated in FIGS. 1 to 3, according to the first to third exemplary embodiments of the present disclosure, the rotary shaft 110 of the motor 100 may be connected to the center of the first sun gear 210. More preferably, the rotary shaft 110 may be directly to the first sun gear 210. For example, the rotary shaft 110 may pass through the center of the first sun gear 210.

On the other hand, as illustrated in FIG. 4, according to the fourth exemplary embodiment of the present disclosure, the rotary shaft 110 of the motor 100 may be spaced apart from the center of the first sun gear 210 in a radial direction R of the first sun gear 210. Thus, according to the fourth exemplary embodiment, a component serving as a medium for power transmission between the first sun gear 210 and the rotary shaft 110 may be additionally provided between the first sun gear 210 and the rotary shaft 110.

Meanwhile, as illustrated in FIG. 3, according to the third exemplary embodiment of the present disclosure, the power transmission device 10 may further include: a first rotary gear 810 connected to the carrier 400 and capable of rotating together with the carrier 400; and a second rotary gear 820 provided between the first rotary gear 810 and the differential gear 700 and engaged with the first rotary gear 810 and the differential gear 700.

As illustrated in FIG. 3, unlike the first exemplary embodiment and the second exemplary embodiment of the present disclosure, the power transmission device 10 according to the third exemplary embodiment may have an off-set structure in which the first reducer 200, the second reducer 300, and the carrier 400 are spaced apart from the differential gear 700. Thus, the first rotary gear 810 and the second rotary gear 820 may components serving as a medium for power transmission between the carrier 400 and the differential gear 700.

Meanwhile, as illustrated in FIG. 4, according to the fourth exemplary embodiment, the power transmission device 10 may further include a third rotary gear 830 connected to the rotary shaft 110 and capable of rotating together with the rotary shaft 110. Here, the third rotary gear 830 may be provided on the outside of the first sun gear 210 and engaged with the first sun gear 210. The third rotary gear 830 may be a component serving as a medium for power transmission between the motor 100 and the first sun gear 210.

As illustrated in FIG. 4, unlike the first to third exemplary embodiments of the present disclosure, the power transmission device 10 according to the fourth exemplary embodiment of the present disclosure may have a structure in which the rotary shaft 110 is spaced apart from the first sun gear 210. Thus, the third rotary gear 830 may be a component serving as a medium for power transmission between the rotary shaft 110 and the first sun gear 210.

Automobile

Referring to FIGS. 1 to 4, an automobile according to the present disclosure may include: a first wheel 20 and a second wheel 30 provided on one side and the other side, respectively, in a left-right direction; and a power transmission device 10 for providing torque to the first wheel 20 and the second wheel 30.

The power transmission device 10 may include: a motor 100 for driving a rotary shaft 110; a first reducer 200 receiving torque from the rotary shaft 110; a second reducer 300 receiving torque from the first reducer 200; a carrier 400 coupled to the first reducer 200 and the second reducer 300; a first clutch 500 provided outside the second reducer 300 and connecting or disconnecting the second reducer 300 and an external component of the power transmission device 10; and a second clutch 600 provided outside the second reducer 300 and connecting or disconnecting the second reducer 300 and an external component of the power transmission device 10.

Also, the power transmission device 10 provided in the automobile may further include a differential gear 700 connected to the carrier 400. Also, the first reducer 200 may include: a first sun gear 210 receiving power from the rotary shaft 110; and a first planetary gear 220 provided on the outside of the first sun gear 210 and engaged with the first sun gear 210. Also, the second reducer 300 may include: a second sun gear 310; and a second planetary gear 320 provided on the outside of the second sun gear 310 and engaged with the second sun gear 310. The second planetary gear 320 is connected to the first planetary gear 220 and revolves together with the first planetary gear 220.

Meanwhile, as described above, the first clutch 500 may be provided outside a ring gear 330 provided in the second reducer 300 and may connect or disconnect the ring gear 330 and the external component of the power transmission device. Also, as described above, the second clutch 600 may be provided outside the second sun gear 310 provided in the second reducer 300 and may connect or disconnect the second sun gear 310 and the external component of the power transmission device.

Meanwhile, as illustrated in FIG. 2, according to the second exemplary embodiment of the present disclosure, the differential gear 700 may include: a first internal gear 710 which is connected to a first wheel shaft 40 connected to the first wheel 20 and which is capable of rotating together with the first wheel 20; a second internal gear 720 which is connected to a second wheel shaft 50 connected to the second wheel 30 and which is capable of rotating together with the second wheel 30; and an external gear 730 provided on the outside of the first internal gear 710 and the second internal gear 720 and engaged with the first internal gear 710 and the second internal gear 720. Here, as illustrated in FIG. 2, the external gear 730 may be connected to the carrier 400 and rotate together with the carrier 400.

Meanwhile, according to the second exemplary embodiment of the present disclosure, the first internal gear 710 and the second internal gear 720, which are provided in the differential gear 700, may have different structures. For example, as illustrated in FIG. 2, the first internal gear 710 may include: an inner gear 712 connected to the first wheel 20 through the first wheel shaft 40; and an outer gear 714 provided between the inner gear 712 and the external gear 730 and engaged with the inner gear 712 and the external gear 730. On the other hand, the second internal gear 720 may have a single gear structure.

As described above, the differential gear having a planetary gear structure may be provided in the automobile according to the second exemplary embodiment of the present disclosure. In this case, the volume of the automobile or the power transmission device may be reduced in an axial direction.

Meanwhile, referring to FIGS. 3 and 4, the rotary shaft 110 of the motor 100 in the automobile according to the third and fourth exemplary embodiments of the present disclosure may be spaced apart from a first wheel shaft 40 connected to the first wheel 20 and a second wheel shaft 50 connected to the second wheel 30 in a radial direction R of the first sun gear 210.

Here, as illustrated in FIG. 3, according to the third exemplary embodiment of the present disclosure, the first sun gear 210 may be spaced apart from the first wheel shaft 40 and the second wheel shaft 50 in the radial direction R.

On the other hand, as illustrated in FIG. 4, according to the fourth exemplary embodiment of the present disclosure, the center of the first sun gear 210 may be aligned with the first wheel shaft 40 and the second wheel shaft 50 in the radial direction R. For example, referring to FIG. 4, the first wheel shaft 40 and the second wheel shaft 50 may pass through the center of the first sun gear 210.

Based on the above description, driving methods of the power transmission device 10 and the automobile according to the present disclosure will be described below.

In the power transmission device and the automobile according to the present disclosure, two types of speed reduction modes may be obtained.

First, in a first stage-speed reduction mode by the power transmission device 10, the ring gear 330 is engaged with the external component of the power transmission device by the first clutch 500, but the second sun gear 310 is disconnected from the external component of the power transmission device by the second clutch 600. Thus, the torque of the rotary shaft 110 according to the driving of the motor 100 is transmitted to the carrier 400 through the first sun gear 210, the first planetary gear 220, the second planetary gear 320, and the ring gear 330. Here, compared to the rotational angular velocity of the rotary shaft 110, the carrier 400 rotates at a rotational angular velocity which is reduced at a first reduction ratio. Meanwhile, the carrier 400, which has received the power, transmits the power to the differential gear 700. The first wheel 20 and the second wheel 30 receive the power from the differential gear 700 through the first wheel shaft 40 and the second wheel shaft 50 and then rotate. Meanwhile, in the first stage-speed reduction mode, the second sun gear 310 rotates by being engaged with the rotation of the second planetary gear 320.

Second, in a second stage-speed reduction mode by the power transmission device 10, the second sun gear 310 is engaged with the external component of the power transmission device by the second clutch 600, but the ring gear 330 is disconnected from the external component of the power transmission device by the first clutch 500. Thus, the torque of the rotary shaft 110 according to the driving of the motor 100 is transmitted to the carrier 400 through the first sun gear 210, the first planetary gear 220, the second planetary gear 320, and the second sun gear 310. Here, compared to the rotational angular velocity of the rotary shaft 110, the carrier 400 rotates at a rotational angular velocity which is reduced at a second reduction ratio. Meanwhile, the carrier 400, which has received the power, transmits the power to the differential gear 700. The first wheel 20 and the second wheel 30 receive the power from the differential gear 700 through the first wheel shaft 40 and the second wheel shaft 50 and then rotate. Meanwhile, in the second stage-speed reduction mode, the ring gear 330 rotates by being engaged with the rotation of the second planetary gear 320.

Meanwhile, the second sun gear 310 is engaged with the external component of the power transmission device by the second clutch 600, and the ring gear 330 is engaged with the external component of the power transmission device by the first clutch 500. In this case, a parking state may be obtained.

On the other hand, the second sun gear 310 is disconnected from the external component of the power transmission device by the second clutch 600, and the ring gear 330 is disconnected from the external component of the power transmission device by the first clutch 500. In this case, it is possible to prevent the power from being transmitted to the carrier 400 during traveling.

Meanwhile, when $Z_{S1}$ is the number of teeth on the first sun gear 210, $Z_{S2}$ is the number of teeth on the second sun gear 310, $Z_{P1}$ is the number of teeth on the first planetary gear 220, $Z_{P2}$ is the number of teeth on the second planetary gear 320, and $Z_R$ is the number of teeth on the ring gear 330, a first reduction ratio $R_1$ and a second reduction ratio $R_2$ of the power transmission device 10 according to an exemplary embodiment of the present disclosure may be expressed as below.

$$R_1 = (Z_{P1}/Z_{S1}) \times (Z_R/Z_{P2}) + 1$$

$$R_2 = (Z_{P1}/Z_{S1}) \times (Z_{S2}/Z_{P2}) + 1$$

Meanwhile, the content described above with respect to the power transmission device 10 according to the present disclosure may also be applied, in the same manner, to the automobile according to the present disclosure.

According to the present disclosure, the reducer for an automobile may be manufactured, which is capable of providing the plurality of reduction ratios even with the simple structure compared to the related art and also has the improved durability.

Although the present disclosure has been described with specific exemplary embodiments and drawings, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. A power transmission device, comprising:
   a motor configured to drive a rotary shaft;
   a first reducer configured to receive torque from the rotary shaft;
   a second reducer configured to receive torque from the first reducer;
   a first clutch disposed outside the second reducer and configured to couple and uncouple the second reducer and an external component, wherein the external component is configured to provide torque;
   a second clutch disposed outside the second reducer and configured to couple and uncouple the second reducer and the external component; and
   a carrier coupled to the first reducer and the second reducer and configured to transmit the torque of the first reducer to the second reducer such that the carrier rotates at a rotational angular velocity that is reduced at a first reduction ratio in a first stage-speed reduction mode by the power transmission device and rotates at a rotational angular velocity that is reduced at a second reduction ratio in a second stage-speed reduction mode by the power transmission device.

2. The power transmission device of claim 1, wherein the first reducer comprises:
   a first sun gear configured to receive power from the rotary shaft; and
   a first planetary gear disposed outside of the first sun gear and engaged with the first sun gear.

3. The power transmission device of claim 2, wherein the second reducer comprises:

a second sun gear; and
a second planetary gear disposed outside of the second sun gear, engaged with the second sun gear, and configured to rotate together with the first planetary gear.

4. The power transmission device of claim 3, wherein the second reducer comprises a ring gear disposed outside of the second planetary gear and engaged with the second planetary gear.

5. The power transmission device of claim 4, wherein the first clutch is disposed outside the ring gear and configured to couple and uncouple the ring gear and the external component.

6. The power transmission device of claim 3,
wherein the second clutch is disposed outside the second sun gear and configured to couple and uncouple the second sun gear and the external component.

7. The power transmission device of claim 1, further comprising a differential gear connected to the carrier.

8. The power transmission device of claim 7, wherein the rotary shaft is connected to a center of the first sun gear.

9. The power transmission device of claim 7, wherein the rotary shaft is spaced apart from a center of the first sun gear in a radial direction (R) of the first sun gear.

10. The power transmission device of claim 8, further comprising:
a first rotary gear connected to the carrier and configured to rotate together with the carrier; and
a second rotary gear disposed between the first rotary gear and the differential gear and engaged with the first rotary gear.

11. The power transmission device of claim 9, further comprising a first rotary gear connected to the rotary shaft and configured to rotate together with the rotary shaft,
wherein the first rotary gear is provided on the outside of the first sun gear and engaged with the first sun gear.

12. An automobile, comprising:
a first wheel disposed on a left side of the automobile and a second wheel disposed on a right side of the automobile; and
a power transmission device configured to provide torque to the first wheel and the second wheel, wherein the power transmission device comprises:
a motor configured to drive a rotary shaft;
a first reducer configured to receive torque from the rotary shaft;
a second reducer configured to receive torque from the first reducer;
a carrier coupled to the first reducer and the second reducer and configured to rotate at a rotational angular velocity that is reduced at a first reduction ratio in a first stage-speed reduction mode by the power transmission device and to rotate at a rotational angular velocity that is reduced at a second reduction ratio in a second stage-speed reduction mode by the power transmission device;
a first clutch disposed outside the second reducer and configured to couple and uncouple the second reducer from an external component; and
a second clutch disposed outside the second reducer and configured to couple and uncouple the second reducer from the external component, wherein the external component is configured to provide torque.

13. The automobile of claim 12, wherein the power transmission device further comprises a differential gear connected to the carrier,
wherein the first reducer comprises:
a first sun gear configured to receive power from the rotary shaft; and
a first planetary gear disposed outside of the first sun gear and engaged with the first sun gear, and
wherein the second reducer comprises:
a second sun gear; and
a second planetary gear disposed outside of the second sun gear, engaged with the second sun gear, and configured to rotate together with the first planetary gear.

14. The automobile of claim 13, wherein the differential gear comprises:
a first internal gear connected to a first wheel shaft connected to the first wheel and configured to rotate together with the first wheel;
a second internal gear connected to a second wheel shaft connected to the second wheel and configured to rotate together with the second wheel; and
an external gear disposed outside of the first internal gear and the second internal gear and engaged with the first internal gear and the second internal gear,
wherein the external gear is connected to the carrier and configured to rotate together with the carrier.

15. The automobile of claim 14, wherein the first internal gear comprises:
an inner gear connected to the first wheel; and
an outer gear disposed between the inner gear and the external gear and engaged with the inner gear and the external gear.

16. The automobile of claim 13, wherein the rotary shaft is spaced apart, in a radial direction (R) of the first sun gear, from a first wheel shaft connected to the first wheel and a second wheel shaft connected to the second wheel.

17. The automobile of claim 16, wherein the first sun gear is spaced apart from the first wheel shaft and the second wheel shaft in the radial direction (R) of the first sun gear.

18. The automobile of claim 16, wherein a center of the first sun gear is spaced apart from the first wheel shaft and the second wheel shaft in the radial direction (R) of the first sun gear.

19. The automobile of claim 16, wherein the first wheel shaft and the second wheel shaft are aligned with a center of the first sun gear in the radial direction (R) of the first sun gear.

* * * * *